US009341505B2

(12) United States Patent
Foster et al.

(10) Patent No.: US 9,341,505 B2
(45) Date of Patent: May 17, 2016

(54) ANOMALY FLUID DETECTION

(71) Applicant: Rosemount Inc., Chanhassen, MN (US)

(72) Inventors: Jeffry Duane Foster, Saint Louis Park, MN (US); Michael D. Anderson, Eden Prairie, MN (US)

(73) Assignee: Rosemount Inc., Chanhassen, MN (US)

( * ) Notice: Subject to any disclaimer, the term of this patent is extended or adjusted under 35 U.S.C. 154(b) by 85 days.

(21) Appl. No.: 14/493,699

(22) Filed: Sep. 23, 2014

(65) Prior Publication Data
US 2015/0323357 A1 Nov. 12, 2015

Related U.S. Application Data

(60) Provisional application No. 61/991,215, filed on May 9, 2014.

(51) Int. Cl.
| | |
|---|---|
| *G01F 1/00* | (2006.01) |
| *G01F 1/34* | (2006.01) |
| *G01F 1/56* | (2006.01) |
| *E21B 43/34* | (2006.01) |
| *G01F 1/32* | (2006.01) |
| *G01F 1/74* | (2006.01) |
| *G01F 15/08* | (2006.01) |

(52) U.S. Cl.
CPC . *G01F 1/34* (2013.01); *E21B 43/34* (2013.01); *G01F 1/32* (2013.01); *G01F 1/329* (2013.01); *G01F 1/56* (2013.01); *G01F 1/74* (2013.01); *G01F 15/08* (2013.01)

(58) Field of Classification Search
CPC ............. G01R 35/00; G01F 1/00; G01F 1/32; H03K 5/08

USPC ............. 702/106, 45, 48; 73/861.22; 327/311
See application file for complete search history.

(56) References Cited

U.S. PATENT DOCUMENTS

| | | | |
|---|---|---|---|
| 3,885,432 A | 5/1975 | Herzl | |
| 3,982,434 A | 9/1976 | McMurtrie | |
| 4,015,472 A | 4/1977 | Herzl | |
| 4,083,241 A | 4/1978 | Herzl | |

(Continued)

FOREIGN PATENT DOCUMENTS

| | | |
|---|---|---|
| EP | 0 077 764 | 4/1983 |
| EP | 1085301 A2 | 3/2001 |

OTHER PUBLICATIONS

Office Action along with the translation from Chinese Patent Application No. CN201420819243.3, dated Jul. 31, 2015.

(Continued)

*Primary Examiner* — Jewel V Thompson
(74) *Attorney, Agent, or Firm* — Westman, Champlin & Koehler, P.A.

(57) ABSTRACT

A flowmeter includes a process sensor assembly providing a sensor signal and a filter stage comprising a low pass filter and a high pass filter and providing a filtered signal from the sensor signal. A processor determines that a filtered signal is indicative of a low flow condition for a first fluid, alters at least one parameter of the low pass filter and at least one parameter of the high pass filter in response to the low flow condition such that the filter stage provides a new filtered signal, determines that the new filtered signal is not indicative of a low flow condition for a second fluid and generates an alarm in response to the new filtered signal not being indicative of a low flow condition for the second fluid.

22 Claims, 6 Drawing Sheets

(56) References Cited

U.S. PATENT DOCUMENTS

| | | | |
|---|---|---|---|
| 4,094,194 A | 6/1978 | Herzl | |
| 4,134,297 A | 1/1979 | Herzl | |
| 4,876,897 A | 10/1989 | DeCarlo et al. | |
| 4,973,062 A | 11/1990 | Lew | |
| 5,095,760 A | 3/1992 | Lew | |
| 5,121,658 A | 6/1992 | Lew | |
| 5,372,046 A * | 12/1994 | Kleven | G01F 1/329 327/311 |
| 5,429,001 A | 7/1995 | Kleven | |
| 5,463,904 A | 11/1995 | Kalinoski | |
| 5,796,010 A | 8/1998 | Kishiro et al. | |
| 5,942,696 A | 8/1999 | Kleven | |
| 6,170,338 B1 * | 1/2001 | Kleven | G01F 1/3254 73/861.22 |
| 6,298,734 B1 | 10/2001 | Storer et al. | |
| 6,412,352 B1 | 7/2002 | Evans et al. | |
| 6,412,353 B1 | 7/2002 | Kleven et al. | |
| 6,484,590 B1 | 11/2002 | Kleven et al. | |
| 6,557,422 B1 | 5/2003 | Kolahi | |
| 6,651,512 B1 | 11/2003 | Kleven et al. | |
| 6,658,945 B1 | 12/2003 | Kleven | |
| 6,810,719 B2 | 11/2004 | Dutton et al. | |
| 6,993,445 B2 * | 1/2006 | Clarke | G01F 1/329 702/106 |
| 7,013,715 B2 | 3/2006 | Dutton et al. | |
| 7,580,801 B2 | 8/2009 | Unsworth et al. | |
| 2005/0229716 A1 | 10/2005 | Unsworth et al. | |
| 2012/0019389 A1 | 1/2012 | Reese et al. | |

OTHER PUBLICATIONS

Office Action from Chinese Patent Application No. CN201420819243.3, dated Apr. 23, 2015.

International Search Report and Written Opinion of the International Searching Authority dated Aug. 17, 2015 for International Appln. No. PCT/US2015/026782, filed Apr. 21, 2015.

Office Action from Chinese Patent Application No. CN201420819243.3, dated Jul. 31, 2015.

* cited by examiner

ANOMALY FLUID DETECTION

CROSS-REFERENCE TO RELATED APPLICATION

The present application is based on and claims benefit of U.S. provisional patent application Ser. No. 61/991,215, filed May 9, 2014, the content of which is hereby incorporated by reference in its entirety.

BACKGROUND

Oil wells bring fossil-fuels from underground to the surface. In many wells, the output of the well includes a combination of oil, natural gas, water and solid material, such as sand or silt. Separators reside on onshore well pads and offshore platforms and are used to separate the oil and natural gas from each other and from the water and solid debris.

There are many types of density separators but they all function in the same manner by using gravity and an emulsifier layer to separate the constituents of the well output. In particular, the separators slow the fluid flow to allow heavier sand and water to separate from the oil. The water and solid material pass through the emulsifier layer while the oil remains on top of the emulsifier layer. A space is provided above the oil that allows the natural gas to separate from the oil. One or more mist converters may be provided to collect oil droplets that may be suspended in the natural gas.

Separators include an inflow pipe that brings the output of the well into the separator, a natural gas output pipe, an oil output pipe and a water output pipe. If the oil level or water level drops too low, it is possible for natural gas to flow into the oil output pipe or the water output pipe. To prevent this, some separators place valves on the oil output pipe and the water output pipe that are designed to close when the oil level or the water level is too low. These valves, however, are susceptible to sticking due to sand and other debris present in the inflow to the separator. It would be useful to determine if gas is present in the field flow so that steps can be taken to prevent natural gas from entering the oil output pipe.

SUMMARY

A flowmeter includes a process sensor assembly providing a sensor signal and a filter stage comprising a low pass filter and a high pass filter and providing a filtered signal from the sensor signal. A processor determines that a filtered signal is indicative of a low flow condition for a first fluid, alters at least one parameter of the low pass filter and at least one parameter of the high pass filter in response to the low flow condition such that the filter stage provides a new filtered signal, determines that the new filtered signal is not indicative of a low flow condition for a second fluid and generates an alarm in response to the new filtered signal not being indicative of a low flow condition for the second fluid.

A method determines that there is a low flow condition in a conduit based on a first set of filter parameters and that there is not a low flow condition in the conduit based on a second set of filter parameters. An alarm is generated in response to the determination that there is a low flow condition based on the first set of filter parameters but there is not a low flow condition based on the second set of filter parameters.

A process control transmitter includes a sensor assembly that generates a sensor signal based on a condition of a fluid in a process environment. A filter stage receives the sensor signal and applies a low pass filter and a high pass filter to the sensor signal to produce a filtered signal. A diagnostic component receives the filtered signal and based on a change in the filtered signal alters the low pass filter and the high pass filter so that the filter stage produces a new filtered signal. The diagnostic component then sets an alarm state when the new filtered signal indicates the presence of an unwanted fluid in the process environment.

This Summary and the Abstract are provided to introduce a selection of concepts in a simplified form that are further described below in the Detailed Description. The Summary and the Abstract are not intended to identify key features or essential features of the claimed subject matter, nor are they intended to be used as an aid in determining the scope of the claimed subject matter.

DETAILED DESCRIPTION OF ILLUSTRATIVE EMBODIMENTS

Embodiments described below provide a diagnostic module that triggers an alarm when it detects that a conduit designated to carry one type of fluid is actually carrying a second type of liquid. For example, the diagnostic module is able to determine when a conduit designated to carry liquid is carrying a gas and is able to determine when a conduit is designated to carry gas is carrying a liquid. The diagnostic module makes these determinations by monitoring a filtered signal to determine if a low flow condition exists for the liquid designated for the conduit. When a low flow condition is sensed, the diagnostic module changes the filter parameters used to filter the sensor signal. In particular, the diagnostic module uses filter parameters designed to isolate sensor signals associated with a second fluid. If the low flow condition is removed using the new filter parameters, which would occur if the second fluid is flowing through the conduit, the diagnostic module generates an alarm indicating that the conduit is carrying the second fluid instead of the fluid designated for the conduit.

Figure 1:
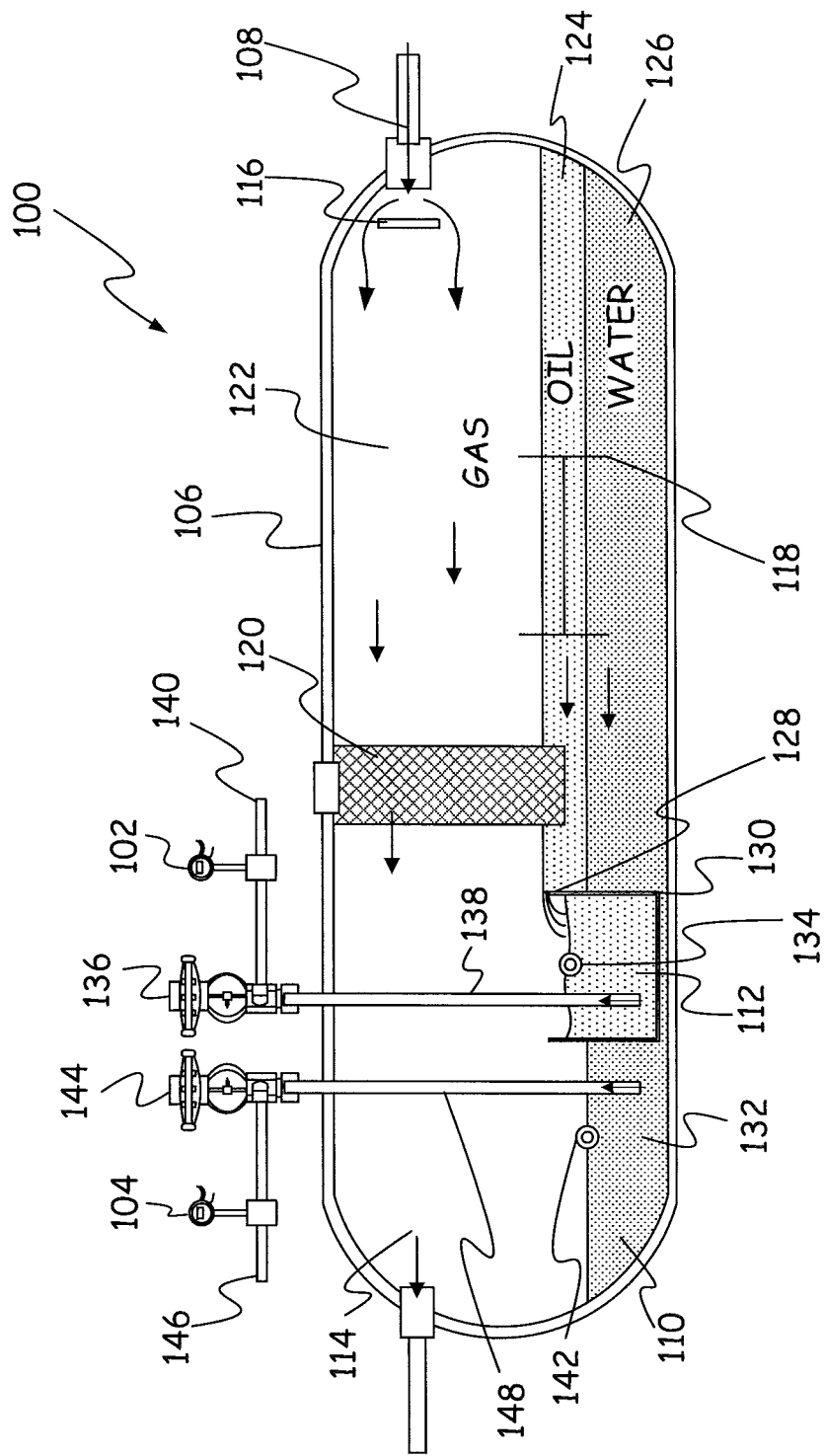
FIG. 1 is a sectional view of a separator.

FIG. 1 provides an example environment 100 in which flowmeters 102 and 104 of the various embodiments may be utilized. Environment 100 includes a separator tank 106 that is able to separate an inflow 108 into various constituents including water 110, oil 112, and gas 114. Inflow 108 may be from a well head, in some embodiments.

Separator tank 106 includes an inlet baffle 116 and a quieting baffle 118 that are used to reduce the velocity of inflow 108 to allow the constituents of inflow 108 to separate from each other to form a gas layer 122, an oil layer 124 and a water layer 126. A mist pad 120 collects water and oil droplets present in gas layer 122 and causes the collected oil and water to drop into oil layer 124 and water layer 126. Oil layer 124 and water layer 126 flow toward a weir 128 that separates oil layer 124 from water layer 126. In particular, oil layer 124 flows over the top of weir 128 into an oil chamber 130. Water layer 126 flows under oil chamber 130 and into a water chamber 132.

The level of oil in oil chamber 130 is controlled by a liquid level controller 134 and a valve 136. As liquid level controller 134 drops, valve 136 is closed to prevent fluid from flowing through valve 136. Examples of liquid level controller 134 include a mechanical controller, a pneumatic controller, and an electronic controller. When operating properly, liquid level controller 134 should completely close valve 136 when the oil level drops below the intake of a downcomer 138 thereby preventing gas 114 from flowing through an output oil conduit 140. Preventing gas from flowing through conduit 140 is important since such gas is valuable and can be dangerous if not handled properly.

The level of water in water chamber 132 is controlled by liquid level controller 142 and valve 144. As the water level in water chamber 132 drops, liquid level controller 142 closes valve 144 to prevent fluids from flowing through output water conduit 146. Liquid level controller 142 may be a mechanical controller, a pneumatic controller, or an electronic controller. By closing valve 144, liquid level controller 142 prevents gas 114 from flowing through conduit 146 when the water 110 in chamber 132 drops below an intake of a downcomer 148. This prevents gas from entering a water storage tank thereby preventing the loss of valuable gas and preventing explosive gases from developing within the water storage tank.

Due to sand in inflow 108 and normal wear, it is possible for valves 136 and 144 to become stuck in an open position. When this occurs, gas flows through conduits 140 and 146. In the embodiments described below, flowmeters 102 and 104 detect this gas flow and provide an alarm so that the level controller and/or the valve may be repaired.

Figure 2:
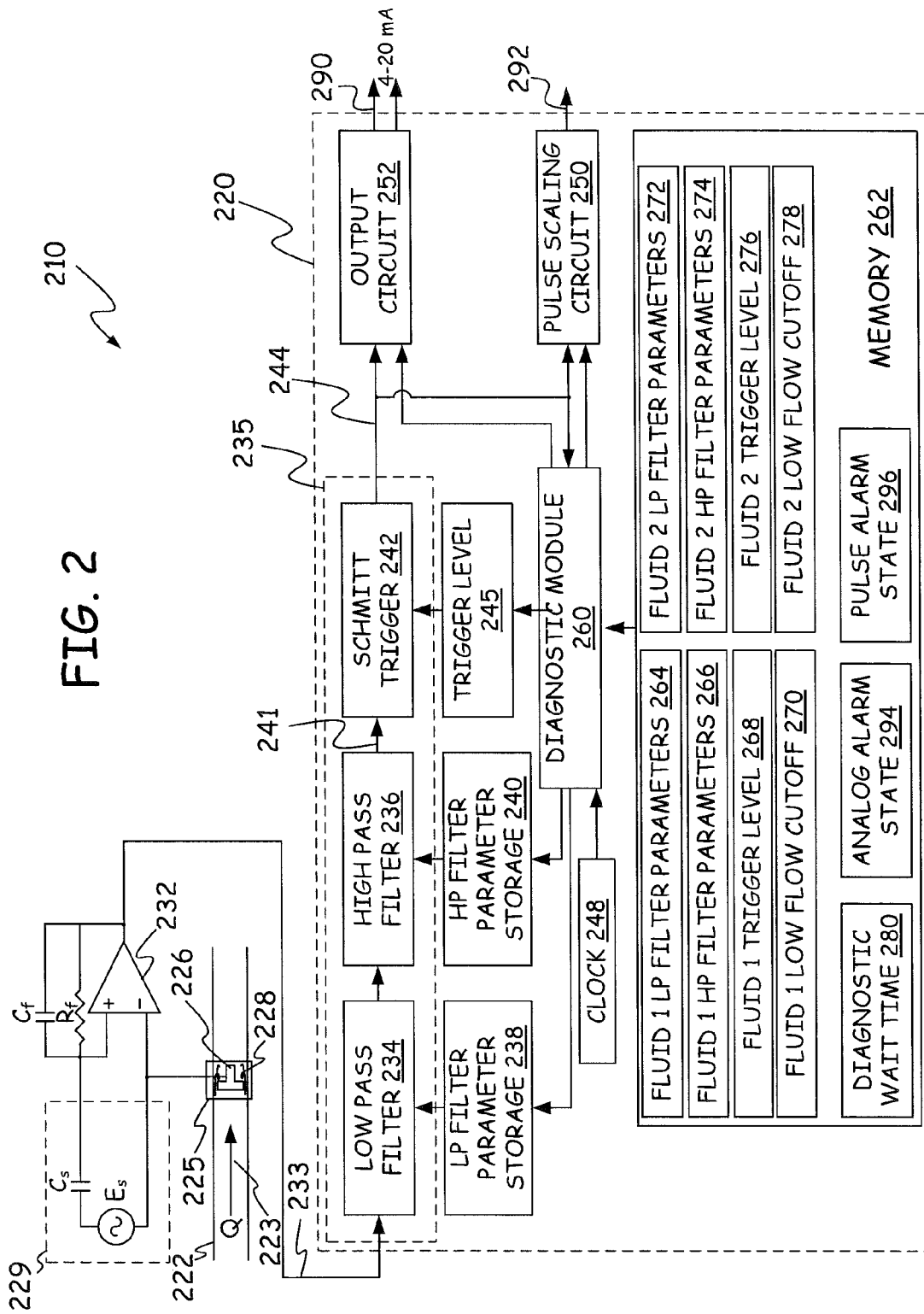
FIG. 2 is a block diagram of a flowmeter in accordance with one embodiment.

FIG. 2 provides a block diagram of a flow meter in accordance with one embodiment. In the embodiment of FIG. 2, the flowmeter is a vortex flow meter 210 including electronics generally indicated at 220 for conditioning a sensor signal 233. Electronics 220 increase the signal-to-noise ratio of signal 233 and produces both an analog signal in the form of a 4-20 mA current representative of flow and a square wave output $F_{out}$ having a frequency proportional to the frequency of sensor signal 233.

Electronics 220 are applicable to field mounted process control instruments which must respond to a wide dynamic range of input frequencies. Electronics 220 are particularly appropriate for meters sensing a physical parameter responsive to a power of the variable which the output represents. For example, both vortex flowmeters and swirlmeters measure fluid flow by sensing an amplitude modulated pressure signal whose frequency is proportional to the flow and output a signal representative of the flow rate.

A liquid or gas 223 flows through a pipe 222. In FIG. 1, pipe 222 is pipe 140 for oil and pipe 146 for water. A vortex meter housing 225 having a bluff body 226 therein is located in pipe 222. When fluid 223 flows past body 226, shedding vortices 228 having a frequency representative of the flow are produced. Bluff body 226, or subsections thereof, move in response to the pressure difference across bluff body due to the vortex shedding. Movement is sensed by, for example, a piezoelectric sensor shown at 229. Sensor 229 is modeled by a voltage source $E_S$ and a series capacitor $C_S$. The magnitude of the output signal from the piezoelectric sensor is proportional to the differential pressure, which is proportional to $\rho V^2$, where $\rho$ is the fluid density and V is the velocity of fluid 223, and also proportional to $\rho D^2 F^2$ (when the ratio of the size of the shedding bar to the pipe diameter is held constant), where D is the inside diameter of meter housing 225 and F is the shedding frequency.

The output of the piezoelectric sensor is coupled to a charge amp 232 which includes capacitor $C_F$ and resistor $R_F$ and outputs vortex sensor signal 233. Together, vortex meter housing 225, bluff body 226, sensor 229, and charge amp 232 provide a process sensor assembly.

Sensor signal 233 is input to a filter stage 235 consisting of low pass filter 234, high pass filter 236 and Schmitt trigger 242. Adjustable two-pole low pass (hereinafter LP) filter 234 conditions signal 233 to remove undesirable high frequency noise. The corner of LP filter 234 is set at or slightly below the lowest flow frequency expected for the fluid expected to be carried in pipe 222.

As the magnitude of vortex signal 233 changes substantially proportionally as the square of fluid 223's velocity and filter 234 has a $1/F^2$ response for frequencies above the filter's low frequency corner, the output of filter 234 is substantially constant, or flattened, at frequencies above the selected low frequency corner. This flattening phenomenon is desirable because it attenuates noise occurring at higher frequencies and at larger amplitudes more than it attenuates the vortex sensor signal 233 and provides a more consistent signal-to-noise ratio over a given flow range. As a result, LP filter 234 prevents the flowmeter from needlessly responding to noise at higher frequencies and at larger amplitudes than signal 233 because of the flattening phenomenon.

High pass filter 236 attenuates the low frequency noise which LP filter 234 does not attenuate and produces signal 241. The frequency response of filter 236 has four poles because of the effective loss of two poles from filter 234 in the frequency range from the LP corner to the HP corner. The HP corner frequency is typically larger than the LP corner frequency in order to provide more noise immunity for low-frequency noise. Without filter 236, the low frequency noise present at the output of HP filter 234 would be particularly troublesome at high flow rates when the low frequency noise has an amplitude greater than the amplitude of the sensor signal.

Schmitt trigger 242 squares the output of HP filter 236 to produce square wave signal 244, which has a frequency substantially equal to the frequency of sensor signal 233. The voltage at which the output of trigger 242 changes state is set based on a trigger level 245 such that signals 241 with a magnitude lower than trigger level 245 do not produce an alternating signal at the output of Schmitt trigger 242.

Filter stage 235 can be operated in two different modes, one for a first fluid and another for a second fluid. For example, filter stage 235 can be operated for liquid water in one mode and for a hydrocarbon gas in a second mode. In another example, filter stage 235 can be operated for oil in one mode and for a hydrocarbon gas in a second mode. In yet another example, filter stage 235 can be operated in one mode for steam and in another mode for liquid water. In the discussion below, the fluid associated with the first mode of operation is referred to as Fluid 1 and the fluid associated with the second mode of operation is Fluid 2. Fluid 1 and Fluid 2 may both be liquids, may both be gases, or one may be a liquid while the other is a gas. In addition, if Fluid 1 and Fluid 2 are not both liquids or both gases, they may represent different states of the same material. For example, Fluid 1 may be steam while Fluid 2 is liquid water. The mode of filter stage 235 is set by adjusting the filter parameters in low pass filter parameters storage 238, high pass filter parameters storage 240 and the trigger level in trigger level 245.

Figure 3:
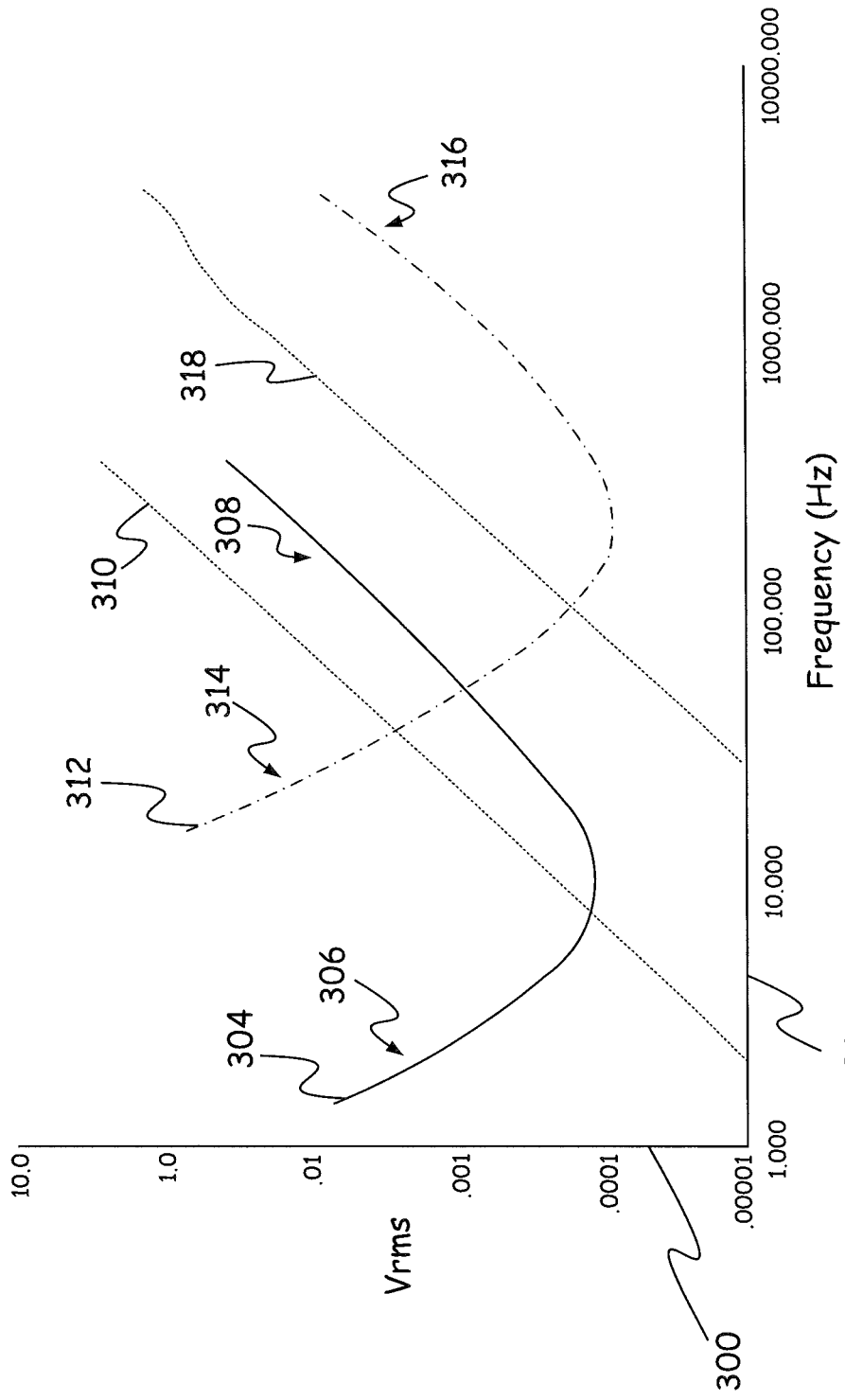
FIG. 3 is a graph of the frequency response of a sensor signal for a liquid, a frequency response of a sensor signal for a gas, the frequency response of a filter stage set for a liquid, and a frequency response of a filter stage set for a gas.

FIG. 3 provides a graph of the frequency response of low pass filter 234 and high pass filter 236 for liquid water and a hydrocarbon gas. In FIG. 3, signal amplitude is shown along vertical axis 300 and signal frequency is shown along horizontal axis 302. The frequencies and the magnitudes are both shown on a log scale. Graph 304 shows the frequency response of the combination of low pass filter 234 and high pass filter 236 set for liquid water. In graph 304, section 306 provides the high pass frequency response and section 308 provides the low pass frequency response. Line 310 provides the expected frequency response of sensor signal 233 for liquid water. In FIG. 3, portions of sensor signal 233 that are below graph 304 are attenuated by the combination of low pass filter 234 and high pass filter 236 when both filters are set for a liquid water mode.

Graph 312 of FIG. 3 provides the frequency response of the combination of low pass filter 234 and high pass filter 236 when those filters are set for a hydrocarbon gas. Section 314 of graph 312 provides the frequency response due to high pass filter 236 and section 316 provides the frequency response to low pass filter 234. In FIG. 3, line 318 provides the frequency response of sensor signal 233 for a hydrocarbon gas. Portions of line 318 that are below graph 312 would be filtered to form filtered signal 241.

Figure 4:
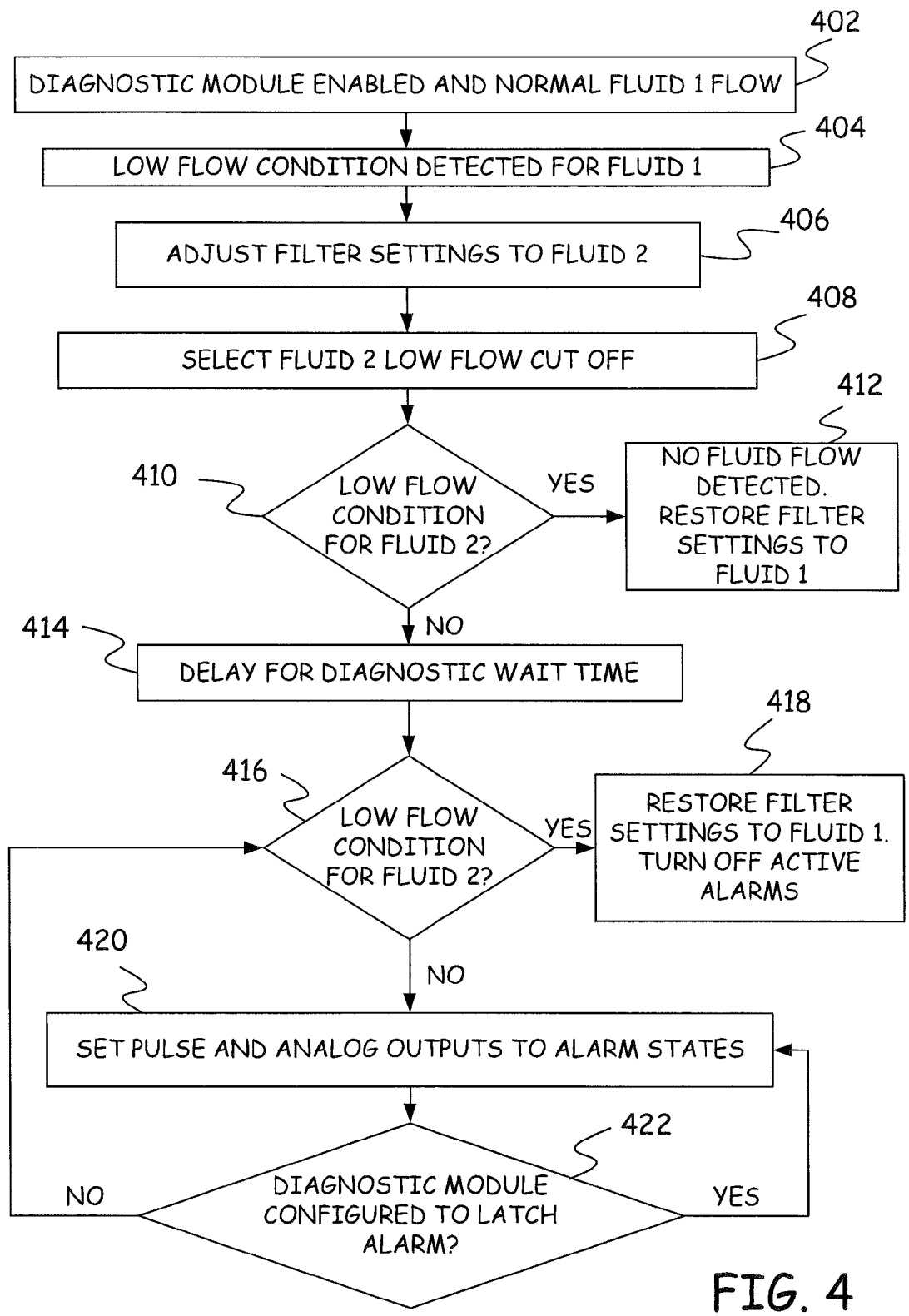
FIG. 4 is a flow diagram of a method of setting an alarm in accordance with one embodiment.

FIG. 4 provides a flow diagram of a method of using the flowmeter of FIG. 2 to set an alarm when a fluid other than a designated fluid passes through conduit 222.

At step 402 of FIG. 4, a diagnostic module 260 is enabled. Diagnostic module 260 receives the output 244 of Schmitt trigger 242. The frequency of output 244 indicates the flow rate of a fluid flowing through conduit 222. In step 402, the filter parameters in LP filter parameters storage 238, HP filter parameters storage 240 and the trigger level in trigger level 245 have all been set for Fluid 1, which is the fluid that has been designated for conduit 222. Examples of such fluids include liquid water, liquid oil, and steam. In accordance with one embodiment, diagnostic module 260 sets the values in low pass filter parameters storage 238, high pass filter parameters storage 240 and trigger level 245 by setting those values to parameter values stored in a memory 262. In particular, diagnostic module 260 places Fluid 1 LP filter parameters 264 in LP filter parameters storage 238, Fluid 1 HP filter parameters 266 in HP filter parameters storage 240 and Fluid 1 trigger level 268 in trigger level 245.

At step 404, diagnostic module 260 detects a low flow condition based on the frequency of Schmitt trigger signal 244. In accordance with one embodiment, diagnostic module 260 compares the frequency of signal 244 to a Fluid 1 low flow cutoff value 270 stored in memory 262. Fluid 1 low flow cutoff value 270 is associated in a fluid designated to be present in conduit 222. Note that Fluid 1 trigger level 268 acts to test the magnitude of the filtered sensor signal and will cause the frequency of signal 244 to drop to zero when the magnitude of the filtered sensor signal drops below trigger level 268. Thus, the low flow condition is based on both the magnitude and the frequency of the filtered sensor signal.

When a low flow condition is detected at step 404, diagnostic module 260 adjusts filter settings and trigger levels for filter stage 235 at step 406. In particular, diagnostic module 260 replaces the Fluid 1 low pass filter parameters in storage 264 with Fluid 2 low pass filter parameters 272 from memory 262. Diagnostic module 260 also replaces the Fluid 1 high pass filter parameters in storage 266 with Fluid 2 high pass filter parameters 274 from memory 262. Fluid 2 low pass filter parameters 272 and Fluid 2 high pass filter parameters 274 are associated with a fluid that may be found in conduit 222 due to a process anomaly. For example, Fluid 2 low pass filter parameters 272 and Fluid 2 high pass filter parameters 274 may be parameters associated with a hydrocarbon gas when conduit 222 is designated to carry oil or water. Alternatively, Fluid 2 low pass filter parameters 272 and Fluid 2 high pass filter parameters 274 can be associated with liquid water when conduit 222 is designated as carrying steam. Fluid 2 low pass filter parameters 272 and Fluid 2 high pass filter parameters 274 are not limited to parameters for these exemplary fluids and the filter parameters may be selected based on any fluid that may be found in conduit 222 during a process anomaly.

Diagnostic module 260 also stores Fluid 2 trigger level 276 from memory 262 as trigger level 245 for Schmitt trigger 242. Fluid 2 trigger level 276 may be lower or higher than Fluid 1 trigger level 268.

At step 408, diagnostic module 260 selects a new low flow cut off level by selecting Fluid 2 low flow cutoff 278. Fluid 2 low flow cutoff 278 represents the frequency of signal 244 that is associated with a low flow condition for Fluid 2 in conduit 222.

Thus, after steps 406 and 408, filter stage 235 and diagnostic module 260 are both configured to filter sensor signal 233 for Fluid 2 and to determine a low flow condition for Fluid 2 from filtered signal 244. At step 410, sensor signal 233 is filtered by filter stage 235 to form filter signal 244, which diagnostic module 260 examines to determine if a low flow condition exists for Fluid 2. In the embodiment of FIG. 2, the sensor signal 233 that is filtered at step 410 is a different portion of the sensor signal than the sensor signal used at step 404 to determine a low flow condition for Fluid 1. Thus, steps 404 and 410 are examining different temporal portions of sensor signal 233 and are not examining the same portion of sensor signal 233.

If the low flow condition exists for Fluid 2 at step 410, no fluid flow is detected in conduit 222 as indicated by step 412. Note that Fluid 2 trigger level 276 acts to test the magnitude of the filtered sensor signal and will cause the frequency of signal 244 to drop to zero when the magnitude of the filtered sensor signal drops below trigger level 276. Thus, the low flow condition is based on both the magnitude and the frequency of the filtered sensor signal.

In response to the low flow condition for Fluid 2, diagnostic module 260 resets the filter parameters in low pass filter parameters storage 238, and high pass filter parameters storage 240, and resets the trigger level in trigger level 245 to Fluid 1 low pass filter parameters 264, Fluid 1 high pass filter parameters 266, and Fluid 1 trigger level 268, respectively. In addition, diagnostic module 260 resets the low flow cutoff to Fluid 1 low flow cutoff 270. Entering state 412 is not an error condition but instead indicates that the valve for conduit 222 has closed such as valve 136 for conduit 140 or valve 144 for conduit 146.

If the low flow condition has been removed at step 410 such that there is no low flow condition for Fluid 2, the process of FIG. 4 continues at step 414 where diagnostic module 260 waits a diagnostic wait time 280 using clock 248. Diagnostic wait time 280 is provided to ensure that the low flow condition has been removed and that Fluid 2 is actually flowing through conduit 222. After diagnostic wait time 280 has expired, diagnostic module 260 once again tests the low flow condition for Fluid 2 at step 416. If the low flow condition has reasserted itself, diagnostic module 260 resets filter stage 235 to Fluid 1 low pass filter parameters 264, Fluid 1 high pass filter parameters 266 and Fluid 1 trigger level 268 at step 418. Diagnostic module 260 also turns off any alarms that diagnostic module 260 had set as described further below. In addition, diagnostic module 260 resets the low flow cutoff to Fluid 1 low flow cutoff 270.

If there is no low flow condition at step 416, Fluid 2 is flowing through conduit 222 and diagnostic module 260 instructs output circuit 252 and pulse scaling circuit 250 to output alarm values at step 420. For example, diagnostic module 260 can instruct output circuit 252 to set the current on analog output 290 to an alarm current value, which is stored as analog alarm state 294 in memory 262. Diagnostic module 260 can instruct pulse scaling circuit 250 to set the frequency on pulse output 292 to an alarm frequency, which stored as pulse alarm state 296 in memory 262. In addition, diagnostic module 260 can cause a digital message representing an alarm to be sent via a digital protocol such as including the HART® communication protocol in which digital information is modulated on to a 4-20 mA current, the Foundation Fieldbus or Profibus communication protocols, etc., or through a wireless communication protocol such as the WirelessHART® communication protocol in accordance with IEC 62591.

At step 422, if diagnostic module 260 is configured to latch the alarm state, it returns to step 420 such that diagnostic module 260 will remain in the alarm state until diagnostic module 260 is externally reset. If diagnostic module 260 is not configured to latch the alarm at step 422, diagnostic module 260 returns to step 416 to determine if a low flow condition for Fluid 2 has occurred. If there is still no low flow condition for Fluid 2, diagnostic module 260 returns to step 420 to reassert the alarm and repeats steps 416, 420, and 422 until a low flow condition is presented for Fluid 2. When a low flow condition is presented for Fluid 2, diagnostic module 260 continues at step 418 where it removes the alarm signals provided by output circuit 252 and pulse scaling circuit 250 and restores filter stage 235 to the Fluid 1 filter parameters and trigger levels.

Figure 5:
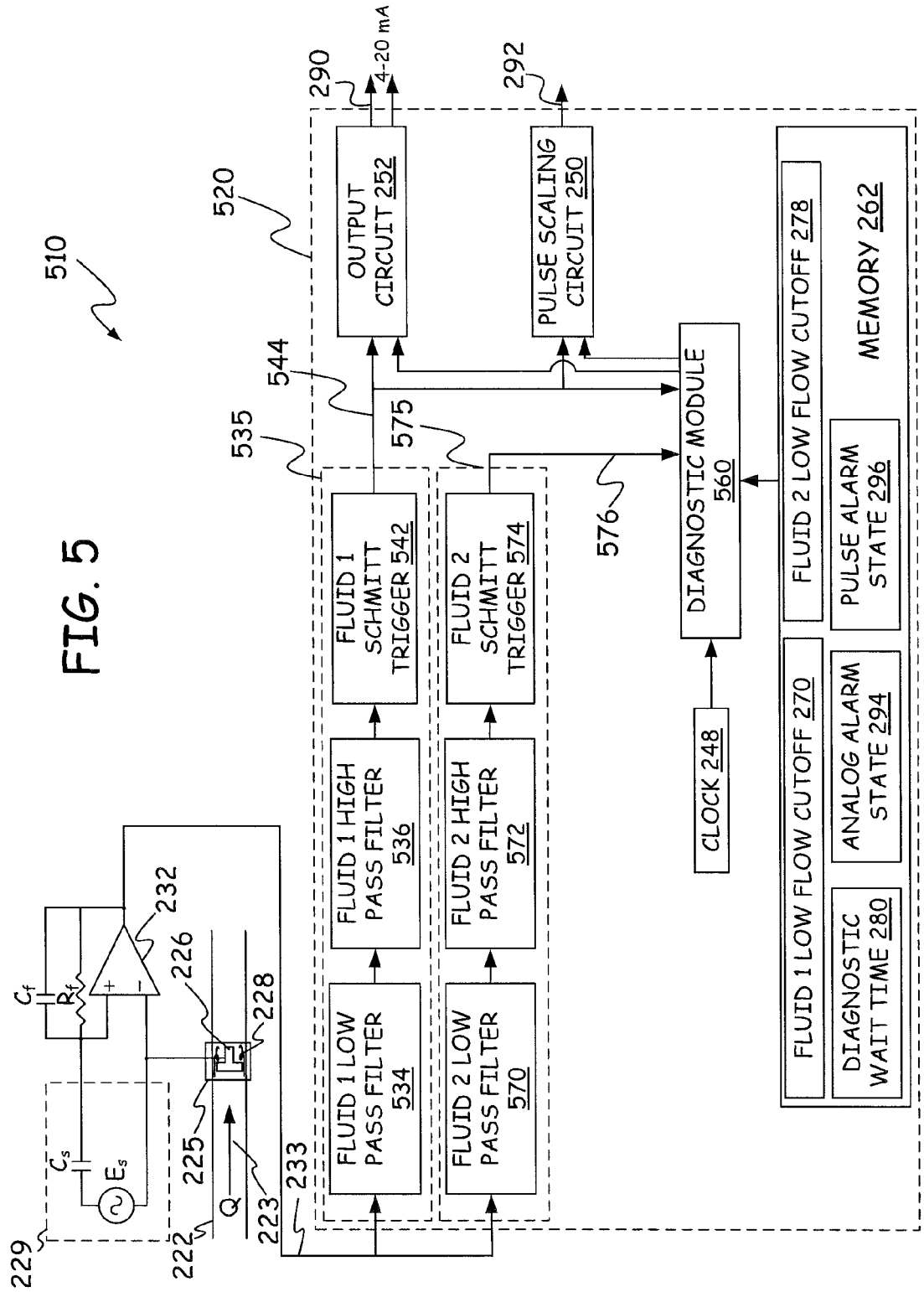
FIG. 5 is a block diagram of a flowmeter in accordance with a second embodiment.
Figure 6:
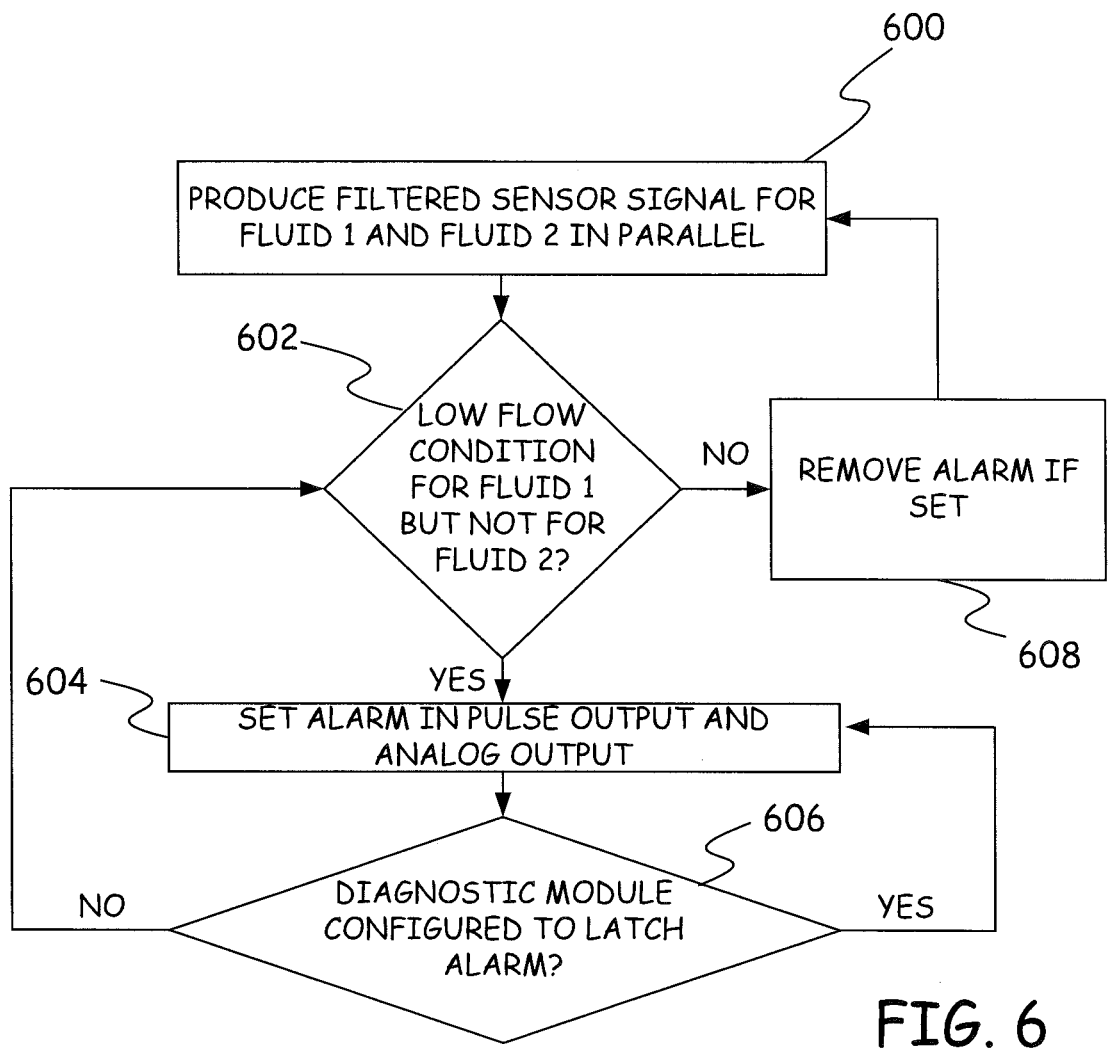
FIG. 6 is a flow diagram of a method of setting an alarm in accordance with a second embodiment.

FIG. 5 provides a block diagram of an alternative embodiment of a flowmeter 510 and FIG. 6 provides a method of setting an alarm using flowmeter 510. In FIG. 5, elements common to FIG. 2 are similarly numbered and are not separately discussed.

In FIGS. 5 and 6, instead of providing different portions of sensor signal 233 to a Fluid 1 filter stage and a Fluid 2 filter stage, the sensor signal is provided to a Fluid 1 filter stage 535 and a Fluid 2 filter stage 575 in parallel at step 600. Fluid 1 filter stage 535 includes a Fluid 1 low pass filter 534, a Fluid 1 high pass filter 536, and a Fluid 1 Schmitt trigger 542 that are all configured to filter a sensor signal generated by Fluid 1 passing through conduit 222. Fluid 2 filter stage 575 includes a Fluid 2 low pass filter 570, a Fluid 2 high pass filter 572, and a Fluid 2 Schmitt trigger 574 that are all configured to filter a sensor signal 233 generated in response to Fluid 2 passing through conduit 222.

As in the examples above, Fluid 1 and Fluid 2 may be any fluids including any types of liquids or gases. In one illustrative embodiment, Fluid 1 is either oil or water and Fluid 2 is a hydrocarbon gas. In another illustrative embodiment, Fluid 1 is steam and Fluid 2 is liquid water.

Filter signal 544 from Fluid 1 Schmitt trigger 542 and filter signal 576 from Fluid 2 Schmitt trigger 574 are both provided to a diagnostic module 560. At step 602, diagnostic module 560 determines if a low flow condition exists for Fluid 1 but not for Fluid 2 using Fluid 1 low flow cutoff 270 and Fluid 2 low flow cutoff 278 in memory 262. In step 602, diagnostic module 560 may examine the low flow conditions of Fluid 1 and Fluid 2 over the diagnostic wait time 280 using clock 248. Thus, the low flow condition for Fluid 1 but not for Fluid 2 must continue during the entire diagnostic wait time 280 in order for diagnostic module 560 to set the alarm at step 604.

Note that the Fluid 1 trigger level acts to test the magnitude of the filtered sensor signal and will cause the frequency of signal 544 to drop to zero when the magnitude of the filtered sensor signal drops below the Fluid 1 trigger level. Similarly, the Fluid 2 trigger level acts to test the magnitude of the filtered sensor signal and will cause the frequency of signal 576 to drop to zero when the magnitude of the filtered sensor signal drops below the Fluid 2 trigger level. Thus, the low flow condition is based on both the magnitude and the frequency of the filtered sensor signal.

If a low flow condition exists for Fluid 1 but not for Fluid 2 at step 602, diagnostic module 560 sets an alarm in pulse output 292 and analog output 290 through pulse scaling circuit 250 and output circuit 252 at step 604. In addition, diagnostic module 260 can cause a digital message representing an alarm to be sent via a digital protocol such as including the HART® communication protocol in which digital information is modulated on to a 4-20 mA current, the Foundation Fieldbus or Profibus communication protocols, etc., or through a wireless communication protocol such as the WirelessHART® communication protocol in accordance with IEC 62591. If diagnostic module 560 is configured to latch the alarm state at step 606, diagnostic module 560 returns to step 604 until diagnostic module 560 is externally reset. If diagnostic module 560 is not configured to latch the alarm, it returns to step 602 to determine if there is a low flow condition for Fluid 1 but not for Fluid 2. If the low flow condition continues to exist for Fluid 1 but not for Fluid 2 at step 602, diagnostic module 560 returns to step 604 and reasserts the alarm.

When either or both the low flow condition for Fluid 1 ceases to exist or a low flow condition for Fluid 2 develops at step 602, diagnostic module 560 removes the alarm if an alarm has been set at step 608. Diagnostic module 560 then returns to step 600.

Flowmeter 210 may have any values in memory 262 externally set such that flowmeter 210 may be programmed externally to work with any fluid as Fluid 1 and any fluid as Fluid 2. Similarly, values in memory 262 of flowmeter 510 may be set externally.

The low pass filters, high pass filters and Schmitt triggers described above in FIGS. 2 and 5, may be implemented in hardware or may be implemented by a processor. Diagnostic modules 260 and 560 may also be implemented in hardware or may be implemented by a processor executing computer-readable instructions.

Although the present invention has been described with reference to preferred embodiments, workers skilled in the art will recognize that changes may be made in form and detail without departing from the spirit and scope of the invention.

What is claimed is:

1. A flowmeter comprising:
   a process sensor assembly providing a sensor signal;
   a filter stage comprising a low pass filter and a high pass filter and providing a filtered signal from the sensor signal;
   a processor:
   determining that the filtered signal is indicative of a low flow condition for a first fluid;
   altering at least one parameter of the low pass filter and at least one parameter of the high pass filter in response to the low flow condition such that the filter stage provides a new filtered signal;
   determining that the new filtered signal is not indicative of a low flow condition for a second fluid; and generating an alarm in response to the new filtered signal not being indicative of a low flow condition for the second fluid.

2. The flowmeter of claim 1 wherein the flowmeter comprises a vortex flowmeter.

3. The flowmeter of claim 1 wherein altering at least one parameter of the low pass filter comprises altering the at least one parameter of the low pass filter from a value associated with a liquid flow to a value associated with a gas flow.

4. The flowmeter of claim 3 wherein altering at least one parameter of the high pass filter comprises altering the at least one parameter of the high pass filter from a value associated with a liquid flow to a value associated with a gas flow.

5. The flowmeter of claim 1 wherein altering at least one parameter of the low pass filter comprises altering the at least one parameter of the low pass filter from a value associated with a gas flow to a value associated with a liquid flow.

6. The flowmeter of claim 5 wherein altering at least one parameter of the high pass filter comprises altering the at least one parameter of the high pass filter from a value associated with a gas flow to a value associated with a liquid flow.

7. The flowmeter of claim 1 wherein before generating the alarm, the processor waits for a prescribed time and determines that a second new filter signal is also not indicative of a low flow condition for the second fluid.

8. The flowmeter of claim 1 wherein the processor further determines that a low flow condition exists after generating the alarm and ceases generation of the alarm.

9. The flowmeter of claim 1 wherein after ceasing generation of the alarm, the processor resets the at least one parameter value of the low pass filter and the at least one parameter value of the high pass filter.

10. The flowmeter of claim 1 wherein the processor further alters a low flow cut off threshold after altering the at least one parameter of the low pass filter.

11. A method comprising:
determining that there is a low flow condition in a conduit based on a first set of filter parameters;
determining that there is not a low flow condition in the conduit based on a second set of filter parameters; and
generating an alarm in response to the determination that there is a low flow condition based on the first set of filter parameters but there is not a low flow condition based on the second set of filter parameters.

12. The method of claim 11 wherein the alarm indicates a presence of gas in the conduit and the conduit is designated to contain a liquid.

13. The method of claim 11 wherein the alarm indicates a presence of liquid in the conduit and the conduit is designated to contain gas.

14. The method of claim 11 wherein determining that there is a low flow condition based on a first set of filter parameters and determining that there is not a low flow condition based on a second set of filter parameters comprises:
applying a first portion of a sensor signal to a filter stage configured based on the first set of filter parameters to produce a first filtered signal; and
applying a second portion of the sensor signal to the filter stage configured based on the second set of filter parameters to produce a second filtered signal.

15. The method of claim 11 wherein determining that there is a low flow condition based on a first set of filter parameters and determining that there is not a low flow condition based on a second set of filter parameters comprises:
applying a sensor signal to a first filter stage configured based on the first set of filter parameters to produce a first filtered signal; and
applying the sensor signal to a second filter stage configured based on the second set of filter parameters to produce a second filtered signal.

16. The method of claim 11 further comprising after generating the alarm, determining that there is a low flow condition based on the second set of filter parameters and removing the alarm.

17. A process control transmitter comprising:
a sensor assembly generates a sensor signal based on a condition of a fluid in a process environment;
a filter stage receives the sensor signal and applies a low pass filter and a high pass filter to the sensor signal to produce a filtered signal;
a diagnostic component receives the filtered signal and based on a change in the filtered signal:
alters the low pass filter and the high pass filter so that the filter stage produces a new filtered signal; and
sets an alarm state when the new filtered signal indicates the presence of an unwanted fluid in the process environment.

18. The process control transmitter of claim 17 wherein the process environment comprises a conduit.

19. The process control transmitter of claim 18 wherein the change in the filtered signal indicates a low flow condition in the conduit and the diagnostic component sets the alarm state when the new filtered signal indicates the low flow condition is not present.

20. The process control transmitter of claim 19 wherein the filtered signal indicates a low flow condition based on the magnitude of the filtered signal.

21. The process control transmitter of claim 20 wherein the filtered signal indicates a low flow condition based on the frequency of the filtered signal.

22. The process control transmitter of claim 18 wherein the diagnostic component alters the low pass filter and the high pass filter from filter parameters used for a liquid to filter parameters used for a gas.

\* \* \* \* \*